(12) United States Patent
Leabch et al.

(10) Patent No.: US 7,312,954 B1
(45) Date of Patent: Dec. 25, 2007

(54) SUSPENSION BEARINGS FOR DATA STORAGE DRIVE

(75) Inventors: Craig A. Leabch, St. Cloud, MN (US); Shane J. Van Sloun, Waconia, MN (US); Stevenson J. Marek, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 52 days.

(21) Appl. No.: 09/946,161

(22) Filed: Sep. 4, 2001

Related U.S. Application Data

(60) Provisional application No. 60/230,193, filed on Sep. 5, 2000.

(51) Int. Cl.
*G11B 21/02* (2006.01)

(52) U.S. Cl. .................................................. 360/265.2

(58) Field of Classification Search ............. 360/265.2, 360/324.2, 265.4, 265.7, 265.8, 265.9, 266.1, 360/245.5, 245.2, 265.1, 269.7, 266, 265.3, 360/265.5, 265.6; 310/13; 29/603.06
See application file for complete search history.

(56) References Cited

U.S. PATENT DOCUMENTS

| | | | | |
|---|---|---|---|---|
| 4,391,035 A | * | 7/1983 | Van de Bult ............ 29/603.06 |
| 5,198,945 A | * | 3/1993 | Blaeser et al. ........... 360/245.5 |
| 5,301,078 A | * | 4/1994 | Makino et al. .......... 360/265.7 |
| 5,319,512 A | * | 6/1994 | Grapenthin ............... 360/265.9 |
| 5,691,581 A | * | 11/1997 | Umehara et al. ............. 310/13 |
| 5,717,549 A | * | 2/1998 | Jurgenson ................ 360/266.1 |
| 5,808,840 A | * | 9/1998 | Ishimatsu ................ 360/265.7 |
| 5,828,521 A | * | 10/1998 | Hasegawa ................ 360/266.1 |
| 6,055,133 A | * | 4/2000 | Albrecht et al. .......... 360/245.2 |
| 6,236,544 B1 | * | 5/2001 | Hirokawa et al. ........ 360/266.1 |
| 6,487,053 B1 | * | 11/2002 | Matsumura et al. ..... 360/265.7 |
| 6,631,053 B1 | * | 10/2003 | Chew ....................... 360/265.6 |
| 6,636,386 B1 | * | 10/2003 | Boutaghou ............... 360/265.2 |

FOREIGN PATENT DOCUMENTS

WO  WO 9222056 A1 * 12/1992

\* cited by examiner

*Primary Examiner*—Tianjie Chen
(74) *Attorney, Agent, or Firm*—Faegre & Benson LLP

(57) ABSTRACT

A stacked suspension assembly for a data storage drive having, for example, at least two suspension members with each suspension member has a bearing hole therethrough. At least one spacer is positioned between the at least two suspension members to separate adjacent suspension members Each spacer has a bearing hole therethrough. A bearing member can be inserted within the bearing holes of the at least two suspension members and the at least one spacer. The bearing member has an actuator hole into which an actuator pivot member is insertable.

25 Claims, 13 Drawing Sheets

US 7,312,954 B1

SUSPENSION BEARINGS FOR DATA STORAGE DRIVE

This application claims priority from U.S. Provisional Application No. 60/230,193, filed Sep. 5, 2000, the entire content of which is hereby incorporated by reference.

TECHNICAL FIELD

The present invention relates to suspensions or suspension assemblies with, for example, discrete arms used in data storage devices, for example, hard drives. In one sense, it can allow for the elimination of base plates and spacers and the swaging process, which can reduce mass, lower manufacturing cost and improve performance.

BACKGROUND

Information storage devices are in wide spread use, and are used to store and retrieve large amounts of data. Such information storage devices generally include a rigid media for storing information, a read/write device for creating and accessing the information, and an actuator assembly for positioning the read/write device over the rigid media. One common example of such an information storage device is a hard disk drive having one or more rotating magnetic disks, over a surface of each of which a head suspension and a head slider are positioned. Each of the head suspensions is attached to an actuator arm of the actuator assembly, and the actuator assembly thus positions the suspensions and sliders at a desired location over the rotating disks.

A conventional actuator assembly in a hard disk drive includes an actuator block, one or more arms extending from the actuator block, and a plurality of head suspensions that are mounted to the arms of the actuator block. The actuator block and arms extending from the block are typically machined from a single piece of starting material, such as aluminum, and are typically referred to as an E-block. The number of arms on the E-block and the number of head suspensions in the actuator assembly are usually dependent on the number of disks in the disk drive, with a head suspension positioned over each magnetic surface of the individual disks. Each head suspension is typically mounted to an arm of the E-block by swaging or ball staking a vertical swage boss extending from a base plate on an end of the head suspension to the arm. In this method, the swage boss is inserted in a hole in the arm and is then deformed to engage the arm by forcing a round ball through the boss. The E-block is coupled to a rotary actuator within the disk drive, and in this manner, the head suspensions can be positioned over a desired location of the disks.

E-blocks having suspensions mounted to the arms of the block have certain disadvantages, however. Increased spacing between the suspensions is typically required to accommodate the height of the vertical swage boss. In addition, a large vertical force must be used to swage the boss to the actuator arm, which can warp or otherwise permanently deform the actuator assembly. Suspensions that are swaged to the actuator block also cannot easily be selectively reworked or replaced due to the nature of the swaging process.

In recent years, integral arms comprising an actuator arm and a head suspension have been introduced into the disk drive industry to address these disadvantages. In such an embodiment, a head suspension is formed integral with an actuator arm from a single piece of material, and the integral arm is mounted over the outer sleeve of an actuator spindle assembly, such as for example by inserting the spindle through an aperture at a proximal end of the integral arm. The spindle assembly is coupled to an actuator, and the actuator positions the integral arm over a desired location of a disk. Because the suspension is formed integral with the actuator arm, an integral arm does not require additional spacing for a swage boss tower, and the arm is not deformed by the large forces required to swage the suspension to the arm. An integral arm also typically has less mass and inertia than an E-block/head suspension combination, which can increase the response time for positioning the head suspension over the disk.

Actuator assemblies can be formed having a stacked array of integral arms to access data stored on a plurality of disks within an information storage device. In such a stacked array, a spindle assembly is inserted through the aperture of a bottom integral arm, and a spacer is placed over the spindle assembly. A stacked array can be formed by placing the aperture of a second arm over the spindle assembly, and a third arm can be placed back-to-back with the second arm in a similar fashion. A spacer can be inserted between the second and third arms if desired, and additional arms and spacers can be added to the spindle as necessary for a specific application. After the desired numbers of arms are inserted over the spindle assembly, a washer and lock nut can be placed on the spindle assembly and tightened to provide an axial compressive force that frictionally secures the arms and spacers to the actuator spindle assembly.

U.S. Pat. No. 5,495,375 discloses a particular spindle assembly. Among other components, the disclosed spindle assembly includes an outer sleeve, a washer, and a nut. It would be preferred that such components were not required.

It is important that the individual arms of the actuator assembly be positioned at the appropriate height (commonly referred to as the Z-height) above an associated disk in the information storage device. In this regard, the arms must be mounted to the actuator spindle assembly at the appropriate location. Unfortunately, the arms on the spindle are dislocated from optimal by the stack up of the height variation of each component, for example the spacer or the arms.

There is therefore a continuing need for an actuator assembly that securely holds head suspensions in place as the actuator rotates, reduces the stack up tolerances being placed all on the top arm assembly, and provides more consistent Z-height variation among all the flying heads. An actuator assembly that provides accurate Z-height spacing of the head suspensions while also reducing the component count and hence cost would also be highly desirable.

SUMMARY OF THE INVENTION

The present invention addresses problems not addressed by the prior art. One embodiment of the invention includes A stacked suspension assembly for a data storage drive, which includes at least two suspension members. Each suspension member has a bearing hole therethrough. At least one spacer is positioned between the at least two suspension members to separate adjacent suspension members. Each spacer has a bearing hole therethrough. A bearing member can be inserted within the bearing holes of the at least two suspension members and the at least one spacer. The bearing member has an actuator hole into which an actuator pivot member is insertable.

Each of the at least two suspension members can have a deformation slot therethrough that is adjacent the bearing hole. The bearing hole can be smaller than the bearing member such that insertion of the bearing member into the bearing hole deforms a portion of the suspension member adjacent the deformation slot.

Each of the at least two suspension members has a deformation region of reduced thickness adjacent the bearing hole. The bearing hole can be smaller than the bearing member such that insertion of the bearing member into the bearing hole deforms the deformation region and reduces deformation to other than the deformation region.

An actuator pivot shaft can be included that is insertable into the actuator hole of the bearing member. The actuator pivot shaft is attachable to a pivoting mechanism of the data storage drive.

Each of the suspension members can have at least one boss hole therethrough. The at least one spacer can have at least one boss protruding from a spacer first surface. The boss and boss hole can be positioned to mate and to align the suspension members.

Each spacer can further include at least one boss protruding from a spacer second surface and be positioned to mate with the boss hole in an adjacent suspension member and to align the suspension members.

At least one of the boss hole can be a boss slot. The boss slot can have a varying inner dimension such that the boss binds in a one portion the boss slot more than in another portion of the boss slot.

Each of the suspension members can have at least one boss protruding from a suspension first surface. The at least one spacer can have at least one boss hole. The boss and boss hole can be positioned to mate with and to align the suspension members.

A voice coil can be included, which can be either integral with or discrete from one of the at least one suspension member.

Each of the at least two suspension members can include an arm joined to a loadbeam. Or, the arm and loadbeam could be integral, that is, fabricated from one piece of material, rather than being joined.

Each of the suspension members can have at least one keyhole therethrough. The at least one spacer can have at least one key protruding from a spacer first surface. The key and keyhole are positioned to mate and to align the suspension members. Each spacer can also include at least one key protruding from a spacer second surface, positioned to mate with the keyhole in an adjacent suspension member. The at least one key hole can be positioned adjacent the bearing hole. The key and keyhole can be sized to create an interference between the two when mated. Mating the two can involve a press fit.

Each of the suspension members can have at least one key protruding from a suspension first surface. The at least one spacer can have at least one keyhole. The key and keyhole can be positioned to mate and to align the suspension members. Each spacer can further include at least one key protruding from a spacer second surface and positioned to mate with the keyhole in an adjacent suspension member. The key and keyhole can be sized to create an interference between the two when mated.

Still another embodiment of the present invention includes a suspension member for a data storage drive. It can include a bearing region having a bearing hole therethrough and a deformation region adjacent the bearing region. The bearing hole can be configured such that when a bearing member is inserted into the bearing hole of the suspension member, the deformation region is deformed and such that deformation to other than the deformation region is reduced.

The deformation region can include a portion of the suspension member adjacent the bearing hole and an at least one deformation hole. The at least one deformation hole can be an at least one deformation slot. Instead, the deformation region can include a reduced thickness of material, thereby more likely to deform that adjacent thicker regions.

Still another embodiment of the present includes a stacked suspension assembly for a disk storage drive. It can include a plurality of suspension members. Each suspension member includes bearing arms. A bearing shaft can have a plurality of depressions into each of which one of the plurality of suspension members is positioned. The depressions can be grooves around at least a portion of the periphery of the shaft. A bearing shaft can includes a bearing hole therethrough into which a actuator pivot member is insertable for rotating the bearing shaft. Instead, the bearing shaft can actually be the actuator pivot member thereby eliminating one part in comparison of the previously noted embodiment.

Still other embodiments of the present invention are contemplated.

DETAILED DESCRIPTION OF PREFERRED EMBODIMENTS

The following disclosure and additional disclosure incorporated by reference, as stated above, refer to details of preferred embodiments of the invention. It should not be taken as limited to all of the details thereof as modifications and variations thereof may be made without departing from the spirit or scope of the invention.

The disclosed invention may be used in conjunction with known devices, articles, compositions of matter, and methods. Further, the invention can be a combination of two or more of the concepts disclosed herein. The invention may be particularly applicable to suspensions or suspension assemblies with; for example, discrete arms used in a data storage drive devices. It can allow for the elimination of base plates and spacers and the swaging process, which can reduce mass, lower manufacturing cost and improve performance. The invention may also be applicable to other devices.

One embodiment involves the joining of one or more suspensions or suspension assemblies and a ring bearing. FIGS. 1-6 illustrate components, including the suspension members 10, spacers 12, voice coil 14, 14', and a ring bearing 16. The suspension member could include an arm, load beam, or a combination of the two.

Figure 1:
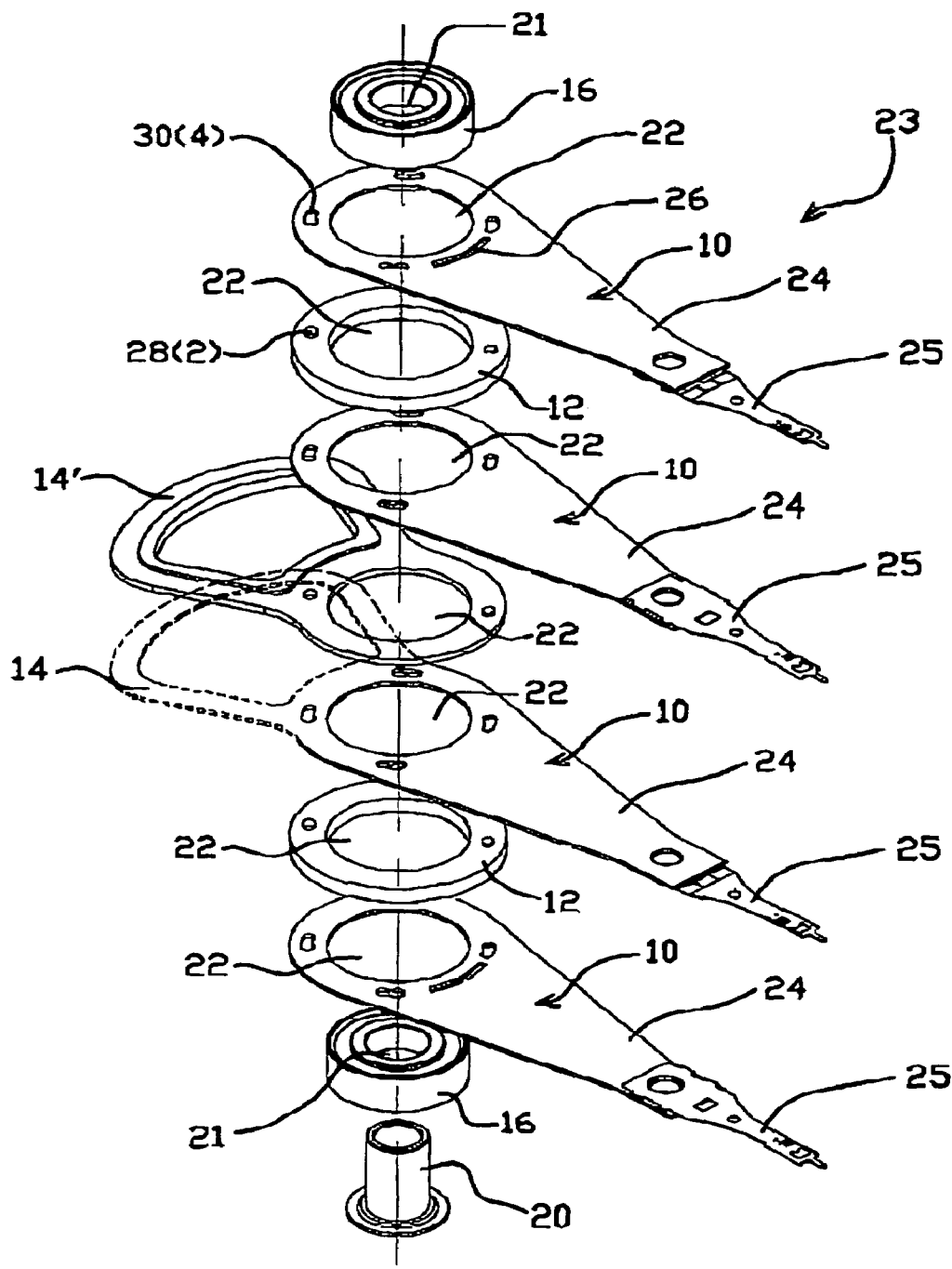
FIG. 1 is a perspective view of an embodiment of the present invention, wherein components are not assembled.
Figure 6:
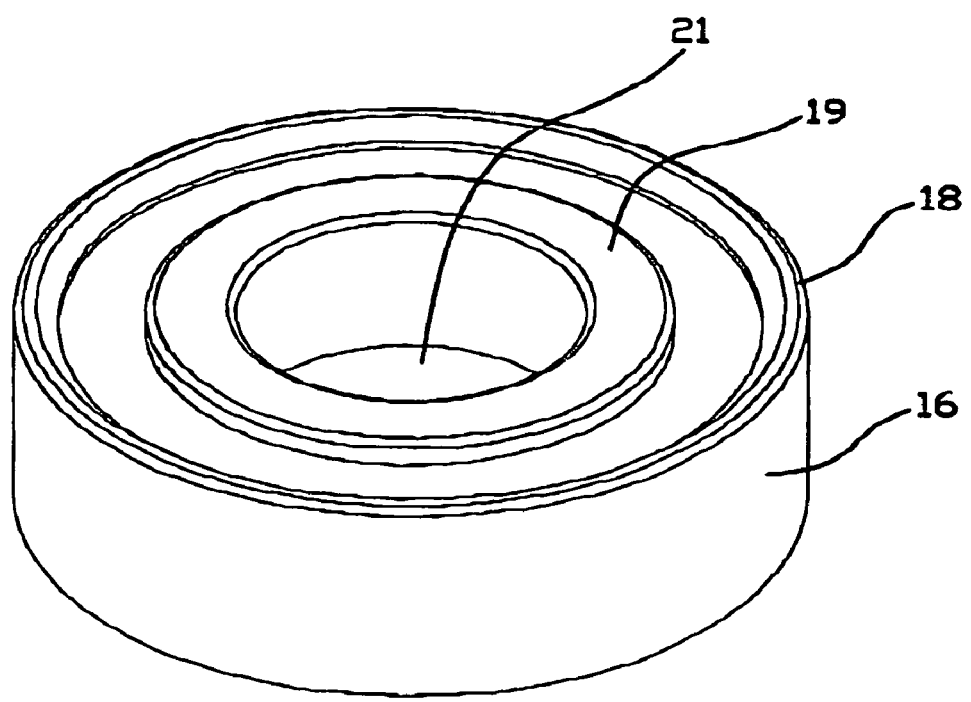
FIG. 6 is a perspective view of an embodiment of the invention shown in FIGS. 1 and 2, specifically the bearing member.

In FIG. 1, the voice coil 14 is shown as part of a suspension member 10 while voice coil 14' is shown as separate from a suspension member 10. Either option can be employed. FIG. 6 also illustrates the ring bearing assembly as including a bearing member 16, bearing outer race 18, and bearing inner race 19. An example of a useful bearing is product DDL940 from NMB Corp., Chatsworth, Calif.

FIG. 6 shows an actuator hole 21 through which an actuator pivot shaft 20 may be positioned when in use. These bearing members are shown to be circular in cross-section though other shapes could be used. The bearing holes 22 in the suspension members 10 could also have shapes other than the circular shape shown.

Figure 2:
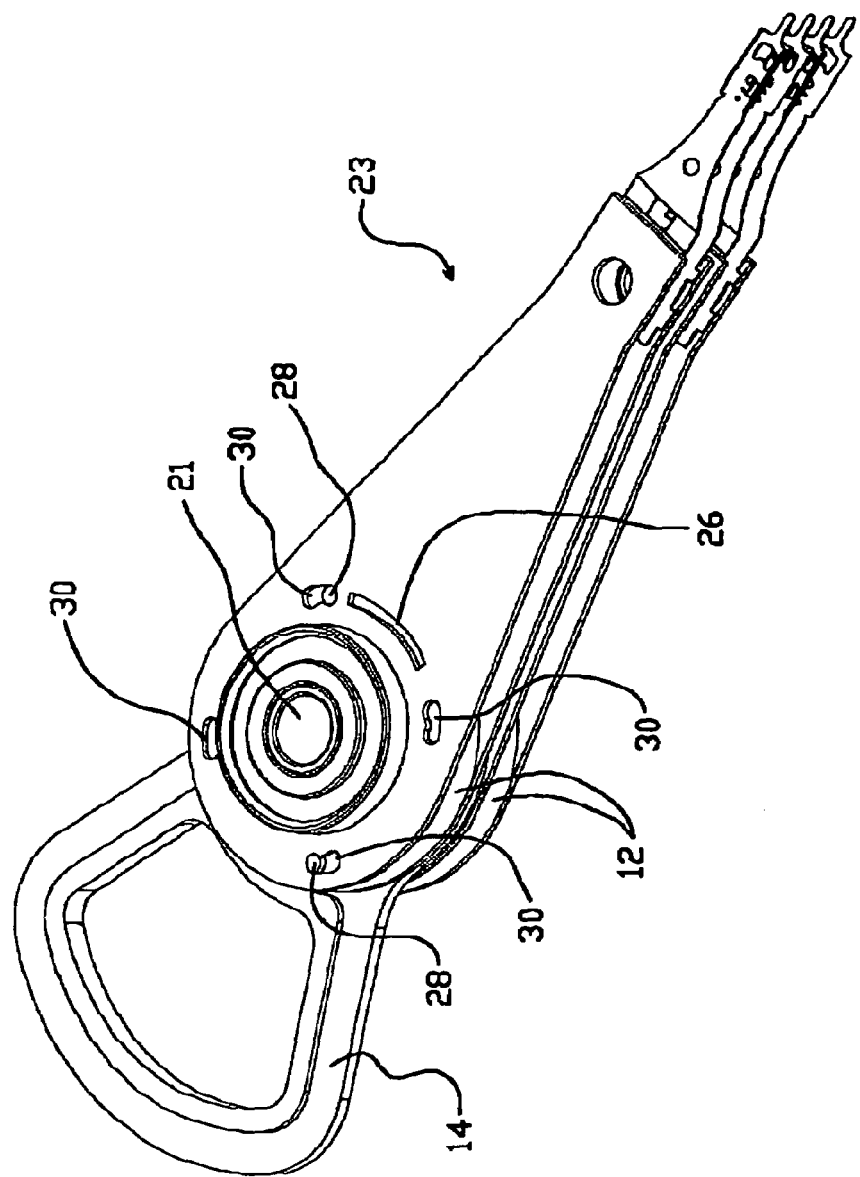
FIG. 2 is a perspective view of the embodiment shown in FIG. 1, wherein the components are assembled.

FIG. 2 shows a stacked assembly 23 constructed from the components shown in FIG. 1. The voice coil 14 in FIG. 2 is not part of a suspension 10, though it could be. Two spacers 12 are shown though a different number of spacers could be employed, such as 1, 3, 4, 5, etc. Other shapes, sizes, combinations and variations could be employed in place of those shown in the FIGS. 1-5.

Figure 3:
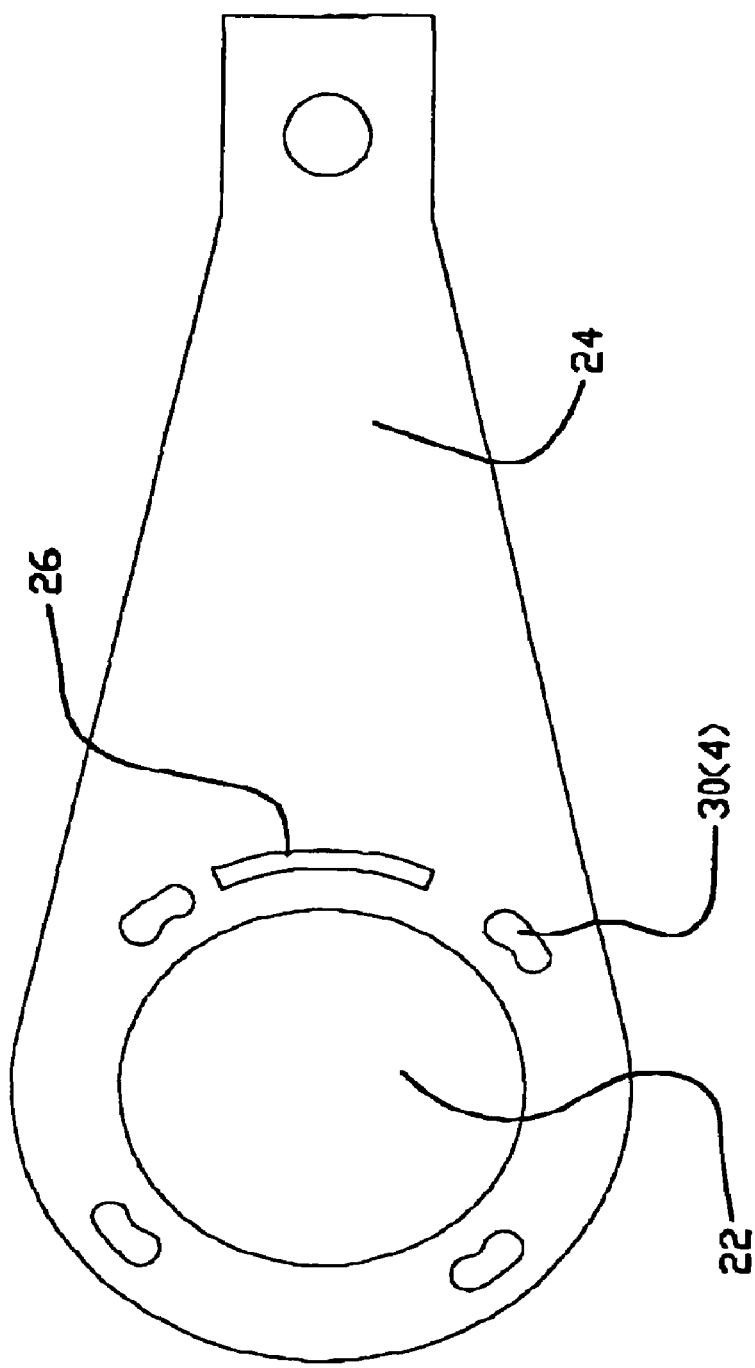
FIG. 3 is a top view of an arm of the embodiment shown in FIGS. 1 and 2, wherein the arm does not include an integral loam beam.
Figure 4:
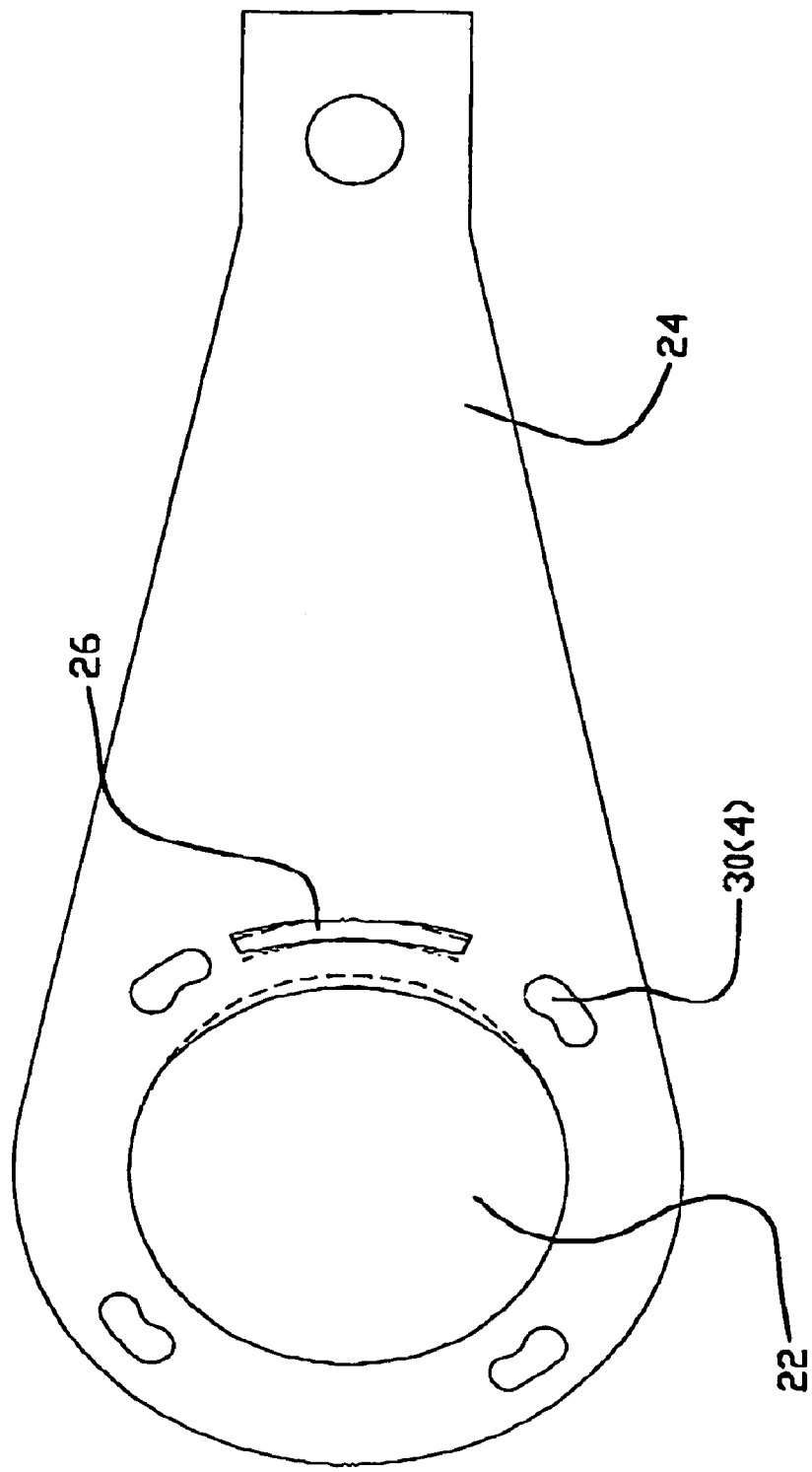
FIG. 4 is a top view of the arm shown in FIG. 3, wherein dotted lines indicate distortion in or strain to portions of the arm when assembled with another element (not shown).
Figure 5:
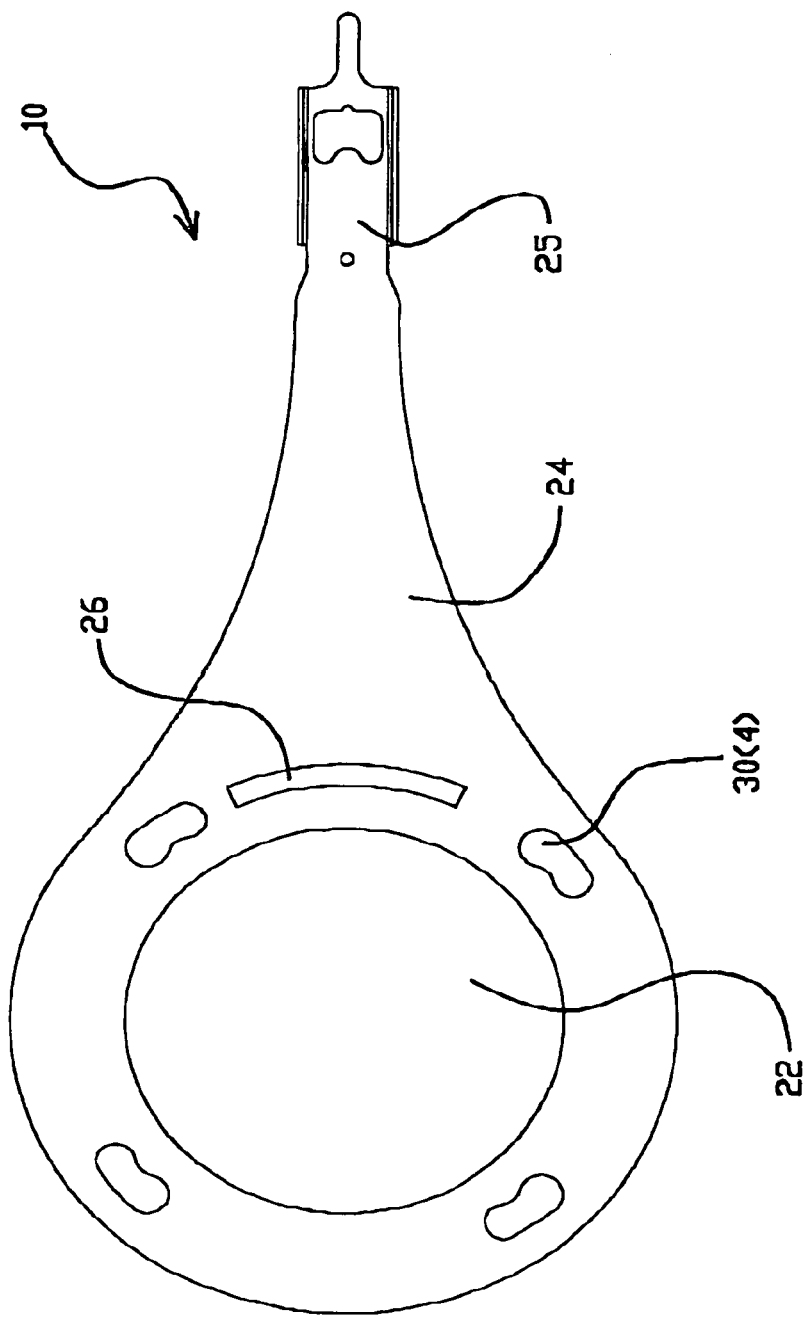
FIG. 5 is a top view of an alternative to the arm shown in FIG. 3, wherein the arm includes an integral load beam.

FIGS. 3-5 illustrate that the suspension member 10 can be designed and made as an arm 24 without an integral load beam (FIGS. 3 and 4) or as an arm 24 with an integral load beam section 25 (FIG. 5).

FIG. 3 illustrates a bearing hole 22 that is slightly out of round, for example, slightly flatter in the longitudinal direction (i.e., "longitudinal" meaning along the length of the suspension 10). The hole 22 could be more or less out of round than shown. A curved deformation slot 26 is positioned adjacent hole 22. In FIG. 4, dotted lines adjacent hole 22 and deformation slot 26 indicate distortion or strain in wall surrounding a portion of the hole 22 and/or the slot 26 that occurs when a bearing member or pivot outer sleeve (not shown), such as a circular cross-section pin or assembly (not shown) is inserted into hole 22. The slot 26 provides strain relief to reduce, if not eliminate damage to the suspension member 10, bearing member 16, and/or stacked assembly 23 when insertion occurs.

Rather than the hole 22 and slot 26 shown in FIGS. 3 and 4, other similar approaches are contemplated. For example, a different shape of the hole 24, such as a round hole may be used, and a different shape and location of the deformation slot 26 may be used. Or, additional deformation slots (or deformation holes) may be used, such as two or more slots 26 positioned at locations adjacent the hole 22. Rather than a deformation slot or hole through the arm 24, this portion of the arm 24 could have reduced thickness, for example, a deformation region. Also, rather than round or out of round shaped bearing holes and the mating ring bearing assemblies, significantly different shapes could be employed such as oval, octagonal, square, rectangular, triangular shaped holes and mating assemblies (not shown). Further, rather than the smooth edge to the hole 22 as shown in FIGS. 1-3, a serrated edge, wavy edge, or another more complex edge could be employed for the hole (not shown).

In FIG. 1, the spacers 12 are shown having bosses 28 that are intended to mate with boss slots 30 of the suspension members 10. FIG. 2 illustrates this mating. The bosses 28 and/or boss slots 30 can be shaped and sized such that insertion of a boss 28 into a boss slot 30 and slight rotation of the suspension member 10 relative to the mating spacer 12 causes boss 28 to bind in the boss slot 30 to lock the suspension member 10 and spacer 12 together and/or to position one relative to the other. That is, one or both of the boss slots 30 can have an inner dimension that varies from one end of the boss slot to the other end such that a boss binds at one end but not at the other end (or binds less at the other end).

Or, the locking of these components can be accomplished through other than the sizing and binding of these components, such as with the application of a secondary locking step (e.g., adhesives, deforming the bosses or the wall forming the boss slots once the bosses are positioned within the boss slots, thereby creating the binding result).

FIG. 2 does not illustrate that the bosses 28 are included on the bottom surface of the spacers 12 or voice coil 14 to mate with the upper portion of boss slots 30 of the suspension members 10. This top and bottom mating is contemplated to be part of the invention or as another embodiment of the invention to effectively join all of the components of the stacked assembly 23. It is contemplated that another embodiment of the invention would not include all of the components locked or fit together, but rather certain components.

It is also contemplated that the bosses and boss slots could be positioned, shaped, or configured differently than shown. Fewer or more bosses/boss slots could be employed. In addition, the bosses could be located on the suspension members to mate with boss slots in the spacers and voice coil, rather than as shown.

Further, in FIGS. 1-5 and 7-12, the spacers 12 and the support portion of the voice coil 14 (that is, the portion forming or joining with a suspension member 10) can preferably be made of a metallic material. Each can instead be polymeric or a combination of polymeric and metallic materials.

Figure 7:
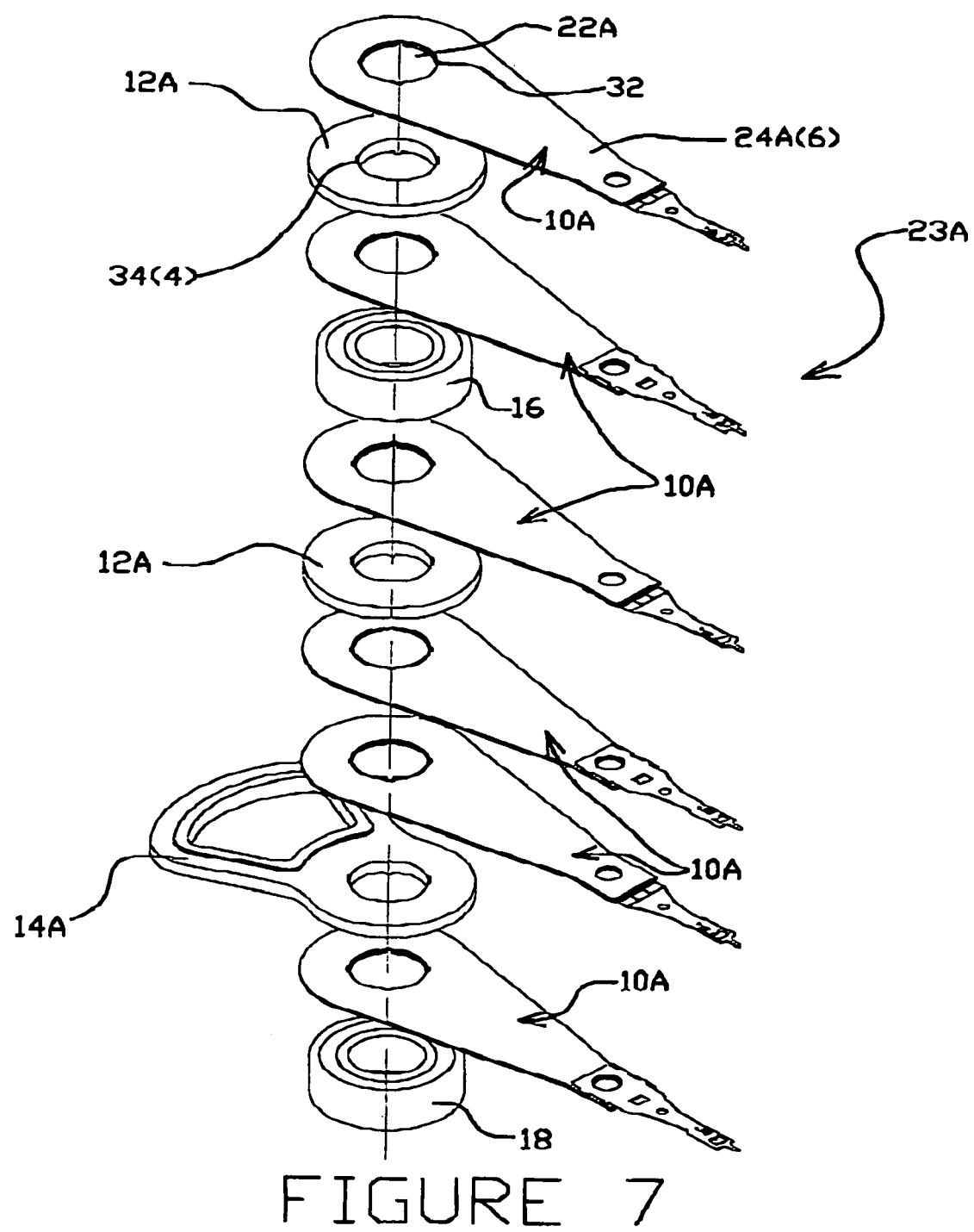
FIG. 7 is a perspective view of another embodiment of the present invention, wherein components are not assembled.
Figure 8:
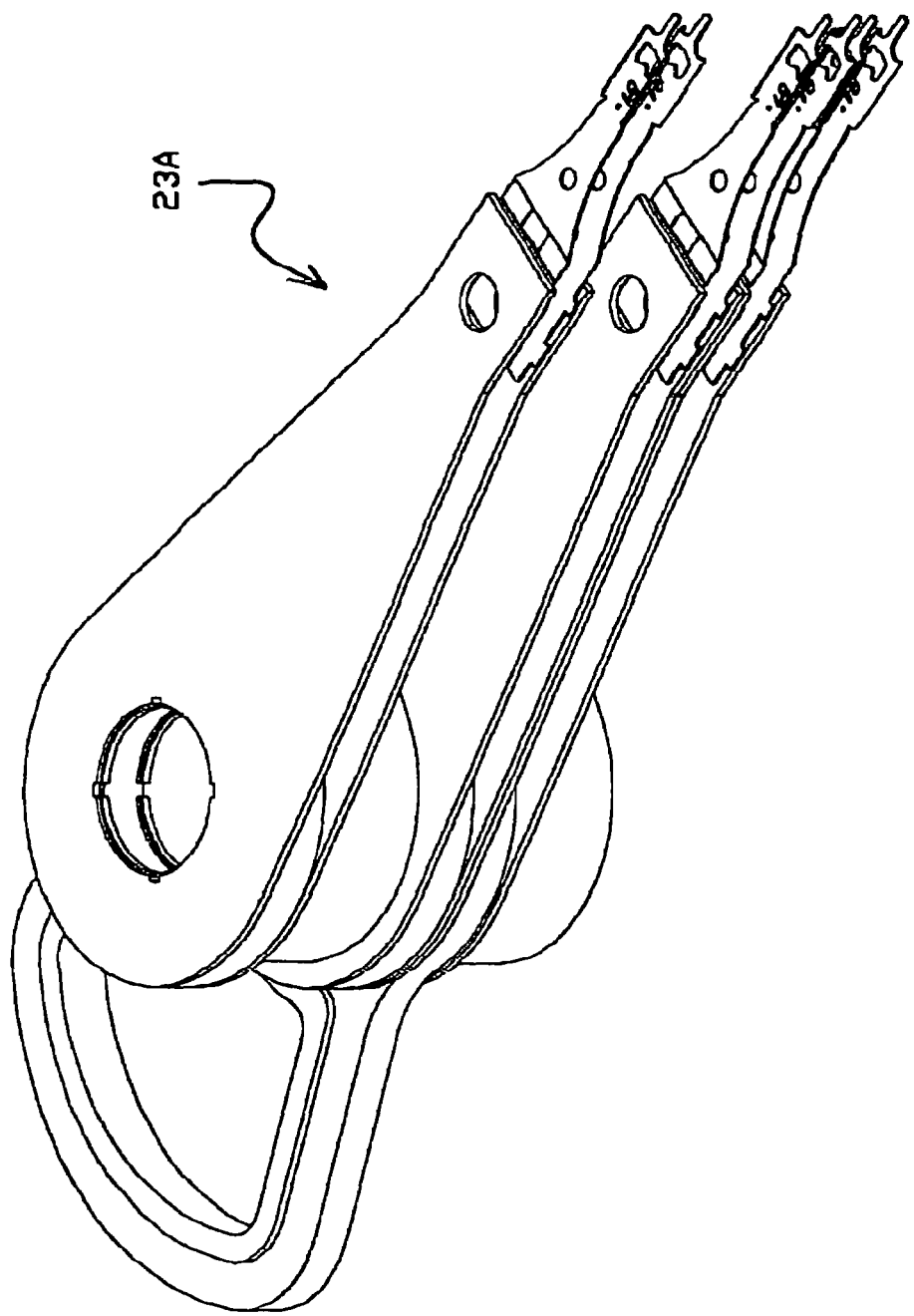
FIG. 8 is a perspective view of the embodiment shown in FIG. 7, wherein the components are assembled.
Figure 9:
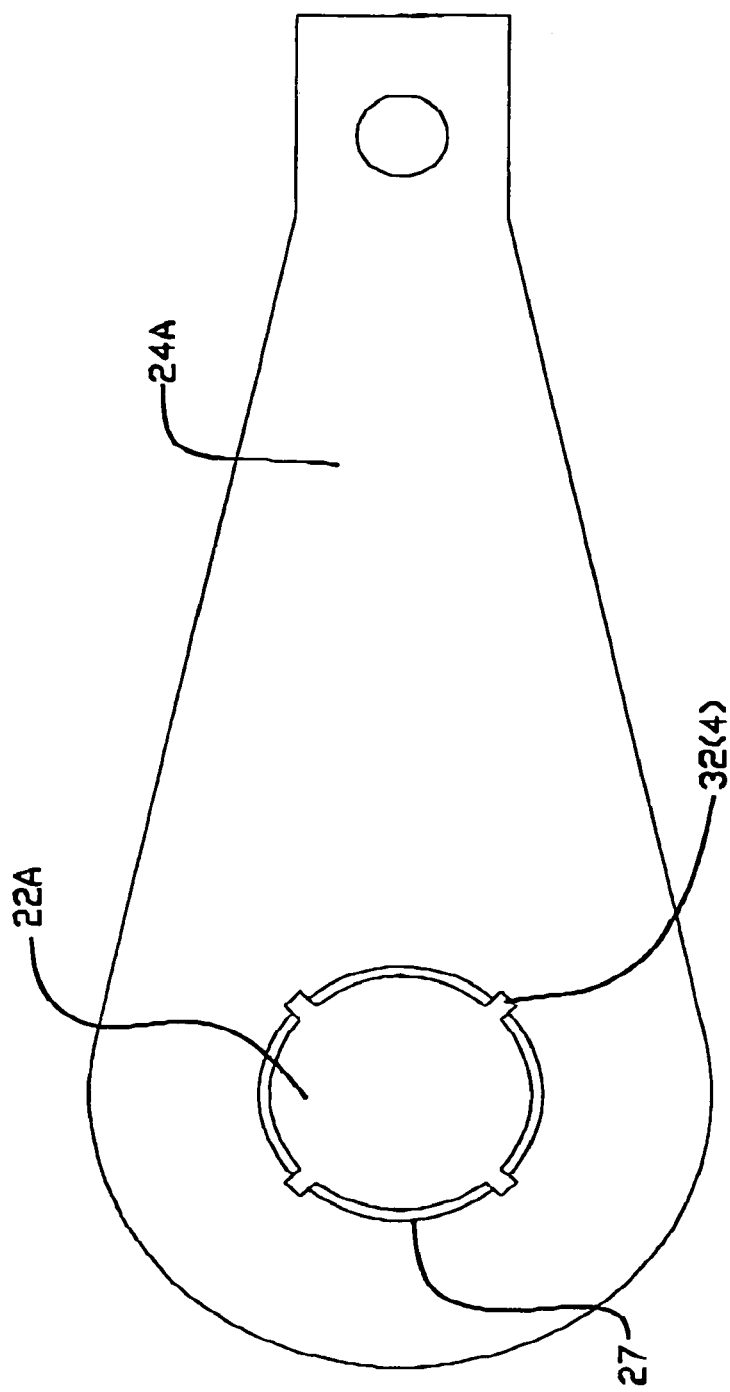
FIG. 9 is a top view of an arm of the embodiment shown in FIGS. 7 and 8, wherein the arm does not include an integral loam beam and wherein the arm includes keyholes adjacent a bearing hole.

FIGS. 7-12 illustrate other embodiments of the invention. FIGS. 7 and 8 illustrate, respectively, an unassembled and assembled stacked assembly 23A. FIG. 9 includes an arm 24A. Each arm 24A includes a bearing hole 22A having one or more notches or keyholes 32. FIGS. 7-9 illustrates four, square-shaped keyholes 32 positioned equidistant around the circumference of the bearing hole 22A, although such equidistant position is not required. FIG. 9 also illustrates arm raised portion 27, which could be formed by creating a fold-over of the material from which the arm 24A is made (e.g., stamped). Arm portion 27 can be press fit into the inner race 19 of bearing member 16. This feature and approach in arm 24A allows the use of larger, stiffer bearing members (e.g., product DDL1260, from NMB Corp.) for the same given arm geometry. This feature and approach could be used implemented with more components than those shown in FIG. 9.

Figure 10:
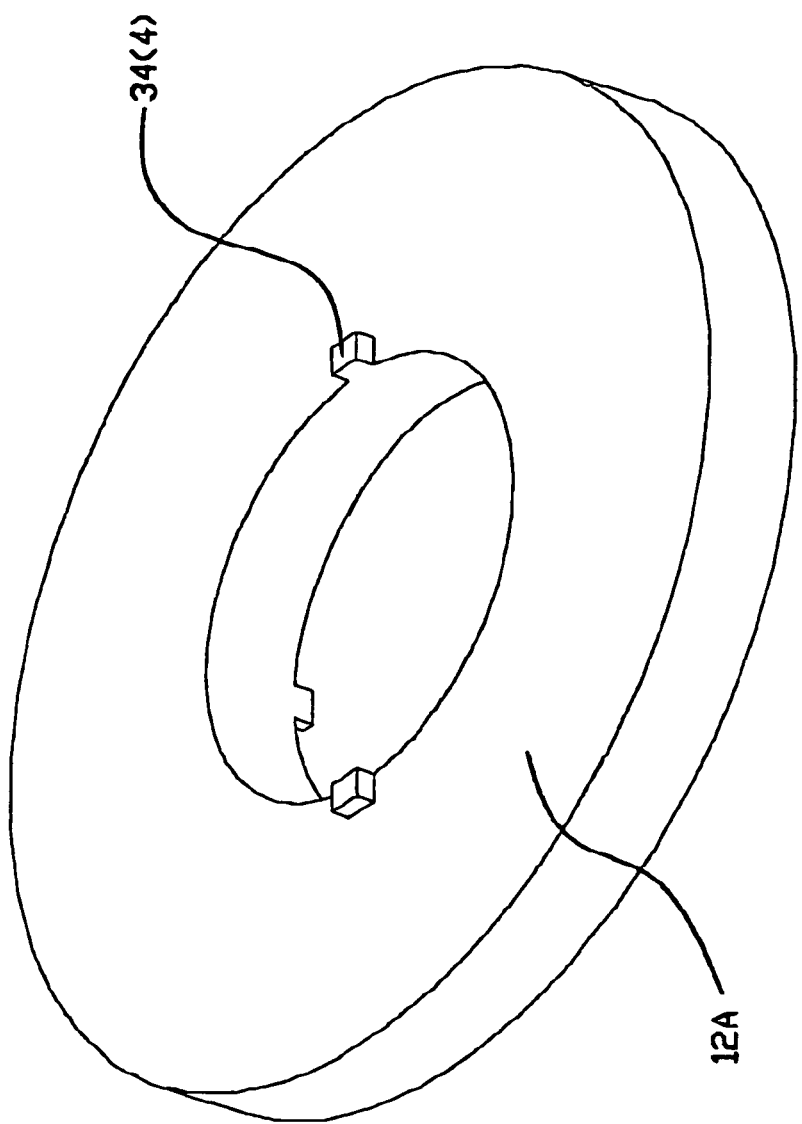
FIG. 10 is a perspective view of a portion of the embodiment shown in FIGS. 7 and 8, specifically a spacer member having key members on upper and lower surfaces.
Figure 11:
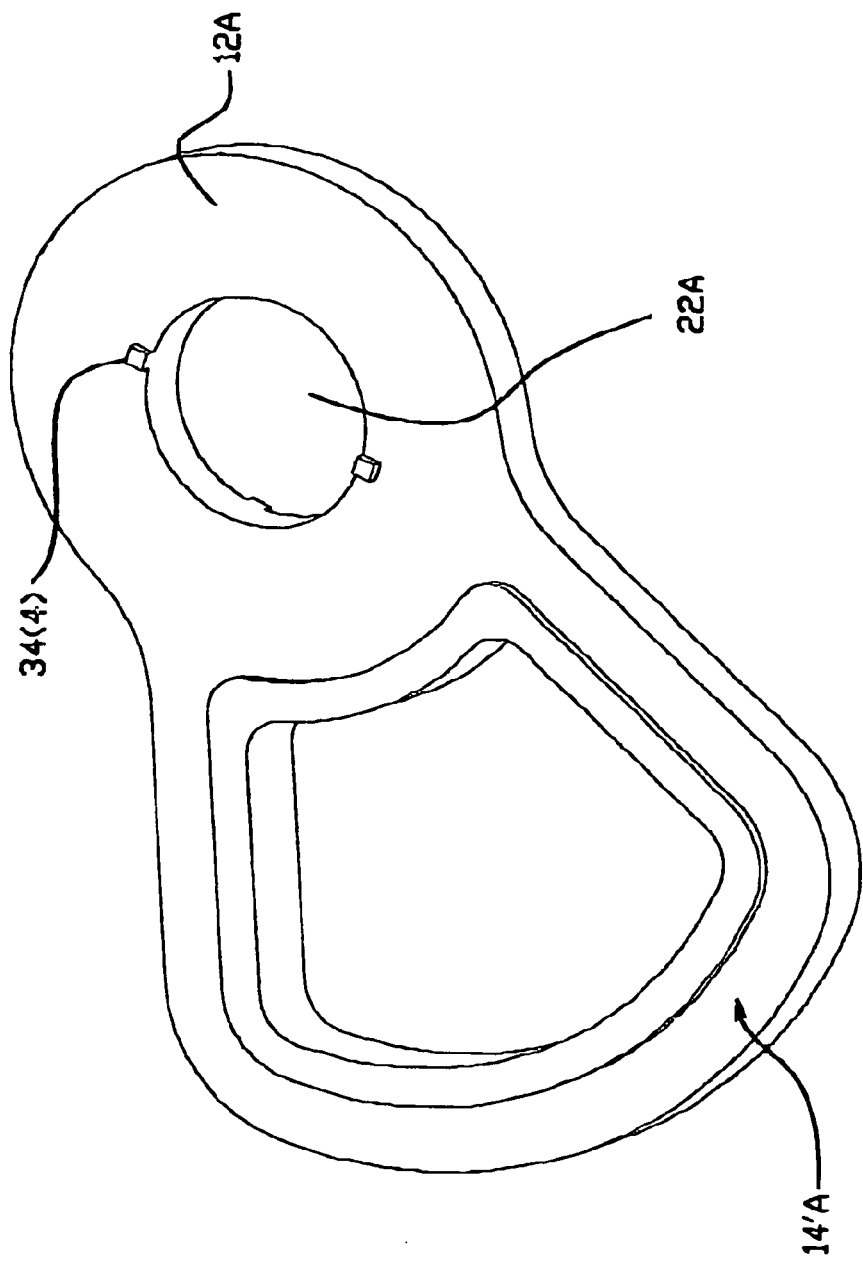
FIG. 11 is a perspective view of a portion of the embodiment shown in FIGS. 7 and 8, specifically a voice coil member having key members on upper lower surfaces of a support portion.

FIGS. 7, 10 and 11 show that spacers 12A and the support portions of the voice coil 14'A can include key members 34 to fit within keyholes 32 of arms 24A. Like the above description of the bosses and boss slots shown in FIGS. 1-5, the key members 34 and keyholes 32 can be positioned, shaped, and otherwise configured differently from that shown in FIGS. 7-12. This mating similarly can provide joining, locking, torque transmission, and/or more accurate, relative location of components within the stacked assembly 23A.

These two general approaches (i.e., bosses/slots, key members/keyholes) can also eliminate the need for a bearing sleeve, washers, or other positioning or locking members (e.g., screws) used in known assemblies. Components, such as the bearing sleeve, washer and lock nut are eliminated because the invention facilitates the same function by aligning, vertically retaining and torque coupling the stack.

Further, these approaches allow for the use of heating and/or lubricating (e.g., temporary lubrication with isopropyl alcohol) to facilitate the assembly process without creating unwanted side effects of such heating or lubricating following assembly, such as a loss of torque transmission between components or positioning of the components relative to one another or relative to a reference point important with respect to operation with other components of a disk storage drive.

In addition, these approaches more effectively allow for the thickness variation distribution of suspension members 10 within a single stacked assembly 23 reducing the effect of undesired stacking tolerances of multiple components used in stacked assembly 23 and 23A. For example on stack assembly 23, rather than stacking the tolerances of multiple components and attachment means between such components, the stacking tolerances can be evenly distributed amongst all the head suspensions by vertical adjustment of stack 23 on the bearing member evenly distributed amongst all the head suspensions by vertical adjustment of stack 23 on the bearing members 16.

Figure 12:
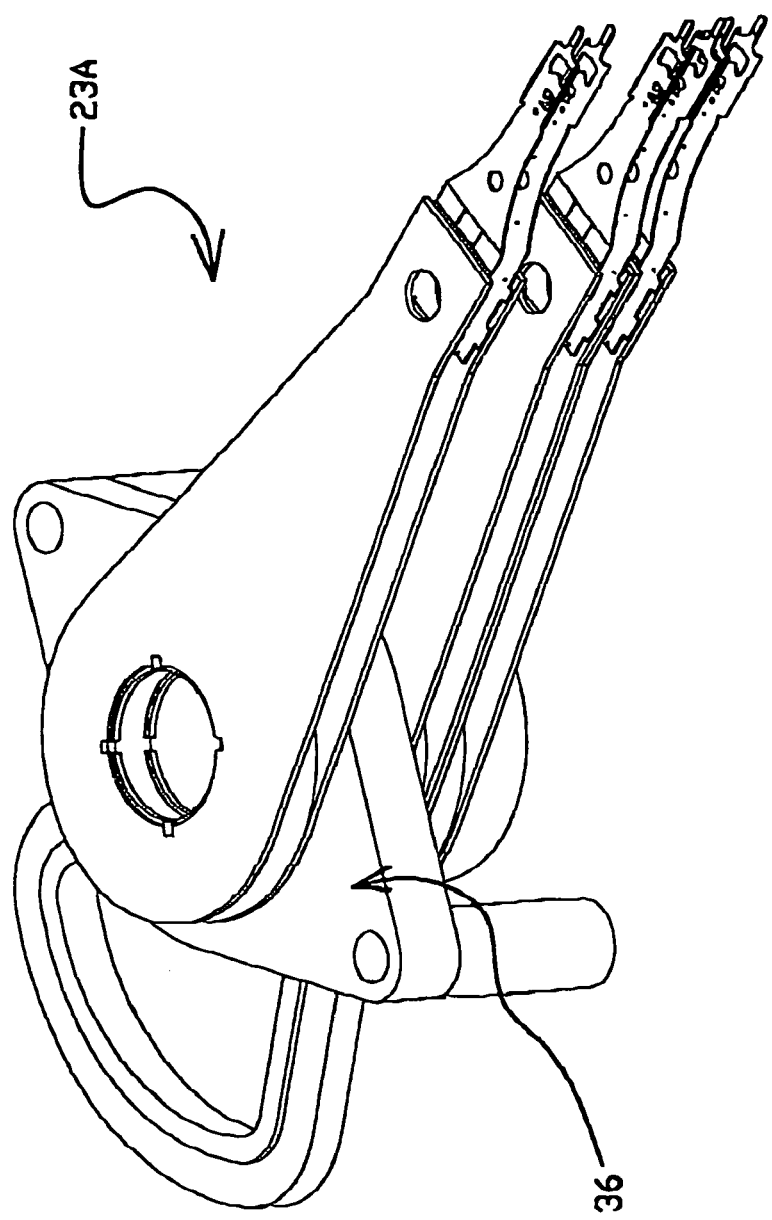
FIG. 12 is a perspective view of an embodiment similar to that shown in FIG. 8, wherein a support member has been added.

FIG. 12 shows further explanation of the embodiment shown in FIG. 8, except indicating how support member 36 is employed. The support member 36 or other designs of support members (not shown) can be used to provide more stability to the stacked assembly 23. The support member can connect to another structure, e.g., the HDD case, within the disk storage device (not shown) to provide preload to the bearing member. The lower bearing member 16 of FIG. 12, that is the bearing member 16 not attached to support member 36, would be press fit into the same structure (i.e. the HDD case).

Another embodiment can include the use of a split bearing shaft (not shown) to enable expansion of the outer dimension of the shaft to lock or hold the suspension members 10 and/or bearing members 16, in place. The bearing shaft or other engaging member in this respect could be expanded using a pin, slug, screw or other means that is slightly larger then the shaft inner dimension in which one of such means may be inserted.

Another embodiment can involve the use of non-magnetic materials (i.e.: aluminum or plastic) to avoid magnetic interference upon one or more components of the stacked assembly.

Figure 13:
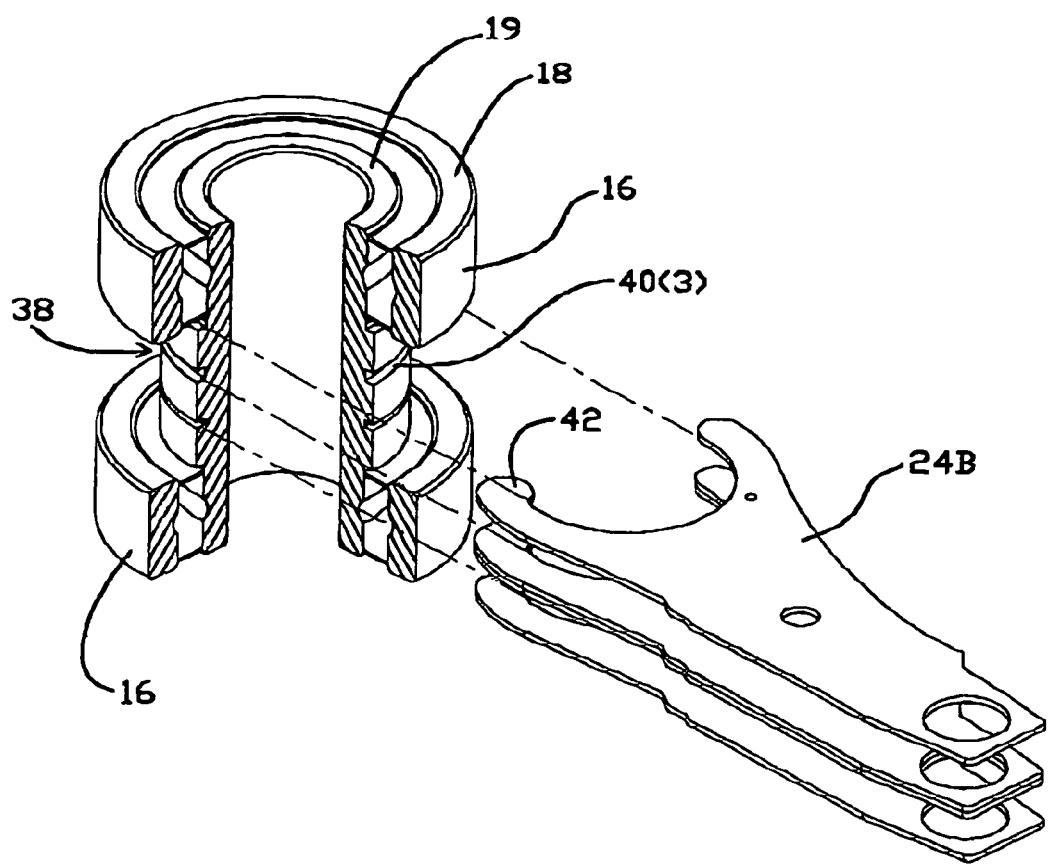
FIG. 13 is a perspective, cut-away view of another embodiment of the present invention including a grooved bearing shaft and actuator arms before being assembled.

Another embodiment is shown in FIG. 13, which illustrates a grooved bearing shaft 38 upon which multiple arms 24B may be positioned. This bearing shaft 38 could actually be the actuator pivot shaft, which would eliminate the need for one component, such as a sleeve over the pivot shaft in which the grooves could be made.

Grooves 40 can be positioned along the shaft 38 to position the suspension members as desired. The arms 24B, as shown, differ from those previously described and shown in that they employ an incomplete bearing hole rather than the complete bearing hole (as shown in FIG. 1). With this incomplete construction, the arms 24B can attached to the shaft 38 by sliding the arms 24B onto the shaft 38, i.e., the portion of the arms that form the incomplete bearing hole can spring outwardly when first contacting the shaft 38, then spring back (either entirely or less than entirely) when fully in place within a groove 40. Feature 42 of each arm 24B is shaped and sized to slide within a mating depression (not shown) in the groove 40 forming a better torque connection between the arm 24B and the shaft 38 such that rotation of the shaft 38 causes rotation of the arm 24B. Feature 42 could be instead or also placed adjacent the other end of the incomplete bearing hole, and it could have a different shape or size than shown.

Rather than the above-described grooved bearing approach, the grooved bearing and suspension members could be configured such that each suspension member is press-fit over the shaft 38 and seated in one the grooves. The outer dimension of the shaft can, for example, be generally constant or can be tapered in one direction or the other so that the press-fitting process results in more secure joining and/or positioning of the suspension members to the shaft 38. For example, the first suspension member may be press fit down to the lowest groove 40 of the shaft 38; with the shaft being larger at the lower portion, the movement over the upper portion does not leave that first suspension member loose within the lowest groove 40. Other approaches along these lines can be employed. For example, rather than having sharp edged grooves 40 as shown, the shaft 38 may instead have a number of longitudinal sections having a reduced outer dimension (e.g., outer diameter; not shown) that would cause the shaft 38 to "neck" more gently or have depressions at these longitudinal sections. The geometry of these necks or depressions would preferably provide the desired positioning accuracy.

Also, the grooves 40 and arms 24B could be configured differently than shown. Rather than being continuous, the grooves 40 could be a two or more unconnected channels (not shown) positioned around a portion of the periphery of the shaft 38 that can mate with arms having a wall that forms the incomplete bearing hole and that is shaped (not shown) to mate with the unconnected channels. An example of this would be that the unconnected channels form a "broken" groove around part or all of the periphery of the shaft 38. Such an approach could improve the connection between the arms and the shaft.

Still other embodiments or variations or combinations of the above-described embodiments are contemplated by the inventors, including but not limited to those incorporated by reference from U.S. Provisional Application No. 60/230, 193, including but not limited to the spring clip. Such other embodiments would similarly address the shortcomings in the prior art, such as limiting the effect of component tolerances, i.e., the avoidance of stack-up tolerances, as well as eliminating unneeded components and providing a torque-locking of components.

The above-noted embodiments can be implemented by one of ordinary skill in the art. For example, the joining of an arm to a loadbeam can be accomplished with known methods, such as welding, spot welding, laser welding, or ultrasonic welding can assemble the stacked assembly 23. Brazing, gluing, press-fitting, or other assembly approaches may be used instead of or in addition to welding. Further, publicly known information regarding the making and using of components and methods described herein augment this disclosure, including information disclosed in patents and published patent applications. For example, U.S. Pat. No. 6,061,896 describes components and methods for making and/or assembling suspensions and/or actuator assemblies that could be used with the invention described or claimed herein; this patent is hereby incorporated by reference.

The invention claimed is:

1. A stacked suspension assembly for a data storage drive, comprising:
    at least two relatively thin and elongated suspension members, wherein each suspension member has a proximal portion having a bearing hole with a diameter and an inner edge therethrough, a deformation structure adjacent to the bearing hole, and a distal portion having a load beam;
    at least one spacer positioned between the at least two suspension members to separate adjacent suspension members, wherein each spacer has a bearing hole therethrough;
    a relatively thick ring bearing having inner and outer races extending into the bearing holes of the at least two suspension members and spacer, wherein the outer race has an outer diameter that is greater than the diameter of the suspension member bearing holes and a height that is greater than the thickness of the suspension member at the bearing hole, and wherein the outer race is in direct frictional engagement with the inner edge of the bearing hole of the suspension members and spacer and the deformation structure on each suspension member is physically deformed by the frictional engagement; and
    an actuator shaft extending into and engaged with the inner race of the bearing.

2. The stacked suspension assembly of claim 1, wherein the deformation structures include a deformation slot.

3. The stacked suspension assembly of claim 1, wherein the deformation structures include a deformation region of reduced non-zero thickness adjacent the bearing hole.

4. The stacked suspension assembly of claim 1, wherein at least one of the bearing holes has serrated edge.

5. The stacked suspension assembly of claim 1, wherein the at least one spacer comprises two spacers.

6. The stacked suspension assembly of claim 1, wherein at least one of the suspension members has at least one boss hole therethrough and wherein the at least one spacer has at least one boss protruding from a spacer first surface, wherein the boss and boss hole are positioned to mate and to align the at least one suspension member and spacer.

7. The stacked suspension assembly of claim 6, wherein the at least one boss hole comprises two, three, or four boss holes, and wherein the at least one boss comprises two, three, or four holes.

8. The stacked suspension assembly of claim 6, wherein each spacer further comprises at least one boss protruding from a spacer second surface and positioned to mate with the boss hole in an adjacent suspension member and to align the suspension members.

9. The stacked suspension assembly of claim 6, wherein at least one of the boss hole is a boss slot.

10. The stacked suspension assembly of claim 9, wherein the boss slot has a varying inner dimension such that the boss binds in one portion of the boss slot more than in another portion of the boss slot.

11. The stacked suspension assembly of claim 1, wherein each of the suspension members has at least one boss protruding from a suspension first surface and wherein the at least one spacer has at least one boss hole, wherein the boss and boss hole are positioned to mate and to align the at least one suspension member and spacer.

12. The stacked suspension assembly of claim 1, further comprises a voice coil, wherein the voice coil is either integral with or discrete from one of the at least one suspension member.

13. The stacked suspension assembly of claim 1, wherein each of the at least two suspension members comprises an arm and a loadbeam, wherein the arm and loadbeam have been joined together.

14. The stacked suspension assembly of claim 1, wherein each of the at least two suspension members comprises an arm and an integral loadbeam.

15. The stacked suspension assembly of claim 1, wherein each of the suspension members has at least one keyhole therethrough and wherein the at least one spacer has at least one key protruding from a spacer first surface, wherein the key and keyhole are positioned to mate and to align the suspension members.

16. The stacked suspension assembly of claim 15, wherein the at least one keyhole comprises two, three, or four keyholes, and wherein the at least one key comprises two, three, or four keys.

17. The stacked suspension assembly of claim 15, wherein each spacer further comprises at least one key protruding from a spacer second surface and positioned to mate with the keyhole in an adjacent suspension member.

18. The stacked suspension assembly of claim 15, wherein the at least one of the key hole is positioned adjacent the bearing hole.

19. The stacked suspension assembly of claim 15, wherein the key and keyhole are sized to create an interference between the two when mated.

20. The stacked suspension assembly of claim 1, wherein each of the suspension members has at least one key protruding from a suspension first surface and wherein the at least one spacer has at least one keyhole, wherein the key and keyhole are positioned to mate and to align the suspension members.

21. The stacked suspension assembly of claim 20, wherein each spacer further comprises at least one key protruding from a spacer second surface and positioned to mate with the keyhole in an adjacent suspension member.

22. The stacked suspension assembly of claim 20, wherein the key and keyhole are sized to create an interference between the two when mated.

23. A relatively thin and elongated suspension member for a data storage drive, comprising a proximal portion having a bearing region and a distal portion having a load beam, the bearing region having a bearing hole therethrough and a deformation region comprising a reduced non-zero thickness region adjacent the bearing region, wherein the bearing hole is configured such that during insertion of a relatively thick bearing member into the bearing hole of the suspension member, the deformation region is deformed and such that deformation to other than the deformation region is reduced.

24. A stacked suspension assembly for a data storage drive, including:
    at least two suspension members;
    at least one spacer between and engaged with the two suspension members;
    a ring bearing having inner and outer races;
    a raised portion on at least one of the suspension members and spacer, the raised portion extending into and in direct engagement with the inner race of the ring bearing; and
    a support member attached to the outer race of the ring bearing.

25. The stacked suspension assembly of claim 24 wherein the at least two suspension members and spacer, and the ring bearing, have bearing holes that are aligned with one another.

* * * * *